United States Patent
Deligeorges et al.

(10) Patent No.: US 7,495,998 B1
(45) Date of Patent: Feb. 24, 2009

(54) BIOMIMETIC ACOUSTIC DETECTION AND LOCALIZATION SYSTEM

(75) Inventors: Socrates Deligeorges, Roslindale, MA (US); Allyn Hubbard, Medfield, MA (US); David Mountain, Byfield, MA (US)

(73) Assignee: Trustees of Boston University, Boston, MA (US)

( * ) Notice: Subject to any disclaimer, the term of this patent is extended or adjusted under 35 U.S.C. 154(b) by 103 days.

(21) Appl. No.: 11/415,347

(22) Filed: May 1, 2006

Related U.S. Application Data

(60) Provisional application No. 60/676,189, filed on Apr. 29, 2005.

(51) Int. Cl.
*G01S 3/802* (2006.01)
(52) U.S. Cl. ..................................... 367/127
(58) Field of Classification Search ............ 367/87, 367/118, 124, 98, 127, 129; 381/92, 23.1, 381/313; 901/50; 700/245
See application file for complete search history.

(56) References Cited

U.S. PATENT DOCUMENTS

| | | | | |
|---|---|---|---|---|
| 4,536,844 | A * | 8/1985 | Lyon | 607/56 |
| 5,473,759 | A * | 12/1995 | Slaney et al. | 704/266 |
| 5,544,129 | A | 8/1996 | McNelis | |
| 5,930,202 | A | 7/1999 | Duckworth et al. | |
| 6,178,141 | B1 | 1/2001 | Duckworth et al. | |
| 6,798,715 | B2 * | 9/2004 | Harmon et al. | 367/99 |
| 2003/0139851 | A1 * | 7/2003 | Nakadai et al. | 700/258 |
| 2004/0165478 | A1 * | 8/2004 | Harmon et al. | 367/87 |

FOREIGN PATENT DOCUMENTS

WO    WO 03/099179 A1 * 4/2003

OTHER PUBLICATIONS

Mountain et al., "Event-based Processing: Spikes are no Coincidence," Assoc. for Research in Otolaryngology, 2001 [Abstract]. Retrieved from www.aro.org/archives/2001/21796.
"Pilar Sniper Countermeasures System," Canberra, 2007 [online]. Retrieved from www.canberra.com.
"SADS-Small Arms Fire Detection System," Rafael, undated [online]. Retrieved from www.rafael.co.il.
"Saic Sentinel Acoustin Counter-Sniper System," Proc. SPIE vol. 2938, 276 (1997) [Abstract]. Retrieved from http://spiedl.aip.org.
"The Sentri Solution," Safety Dynamics Product Information [online], 2007. Retrieved from www.safetydynamics.net.

* cited by examiner

*Primary Examiner*—Dan Pihulic
(74) *Attorney, Agent, or Firm*—BainwoodHuang

(57) ABSTRACT

An acoustic detection and localization system includes a signal acquisition stage, a biomimetic processor, and an acoustic feature processor. The system uses multiple acoustic cues including spectral content, inter-aural time delay (ITD), inter-aural intensity difference (IID), and periodicity content to detect, classify, and localize sound sources. Pairs of acoustic sensors are arranged geometrically with a spacing depending on the application. The biomimetic processing provides for echo suppression to enhance performance in reverberant environments, and automatic gain controls for robustness in noisy environments. Applications include mobile robotic platforms for reconnaissance and surveillance, helmet mounted systems for sniper detection, vehicle-mounted systems for combat awareness, general civilian security systems, and systems for environmental monitoring and tracking of animals.

9 Claims, 12 Drawing Sheets

BIOMIMETIC ACOUSTIC DETECTION AND LOCALIZATION SYSTEM

CROSS REFERENCE TO RELATED APPLICATION

This application claims the benefit under 35 U.S.C. § 119 (e) of U.S. provisional patent application 60/676,189 filed Apr. 29, 2005, the disclosure of which is hereby incorporated by reference in its entirety.

STATEMENT OF GOVERNMENT RIGHTS

The invention disclosed in this application was made with Government support under Contract Number N00014-00-C-0314 awarded by the Department of the Navy, and Contract Number DAAD19-00-2-0004 awarded by the U.S. Army Research Office. The Government has certain rights in the invention.

BACKGROUND

The invention pertains to the field of acoustic signal processing with regard to sound source classification and localization.

SUMMARY

In accordance with the present invention, apparatus and methods are disclosed for acoustic signal processing for sound source classification and localization using "biomimetic" techniques, i.e., techniques that are modeled after structures and functions found in biological systems such as mammalian aural physiology. The system uses several acoustic cues including Interaural Time Delay (ITD), Interaural Intensity Difference (IID), spectral cues, as well as periodicity cues to localize and identify sound sources. Three primary stages of processing include an acoustic acquisition stage, a biomimetic processing stage, and a feature processing stage. The invention maybe utilized with multiple sensor configurations, in fixed positions, on mobile platforms, or worn as part of standard equipment e.g. helmet based arrays.

Illustrative embodiments may be inexpensive to operate and maintain in the field and require relatively little power in use as a passive listening device. The system may be modular and easily configurable by changing or swapping modules. System sensor configurations can easily be adapted for a multiplicity of applications with a varying number of sensors and sensor geometries. Sensor configurations can be on very small scales, as small as a one-inch platform, or can be used on larger scale platforms with small changes to software or hardware. The system can be used with a single-user stand alone system or as a part of a distributed network. Performance is improved for specific mission applications with the addition of acoustic environmental and sound source models to the feature processing stage. A key feature of the system is the ability to operate in reverberant and noisy environments through the use of biomimetic processing. Single sensor arrays can be used for multiple tasks with the addition of new feature processing stages simultaneous using the same acoustic acquisition and biomimetic processing stages. Multiple specific application areas are identified.

The system may utilize a mixture of analog and digital devices with readily available off-the-shelf components. The system may be used with readily available power supplies and easily integrated with a variety of existing technologies and platforms. The feature processing for each sensor array unit provides users with low bandwidth information to network with other sensor arrays or to drive devices or can be used as part of heads-up displays as well as providing data logging capabilities for later processing and analysis.

The system provides accurate locations for sound sources and very robust cues for classifying sound sources. The modularity and mission-configurable feature processing in conjunction with the reverberation and noise tolerance of the system make it a low cost, robust, and versatile option for many acoustic processing tasks.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
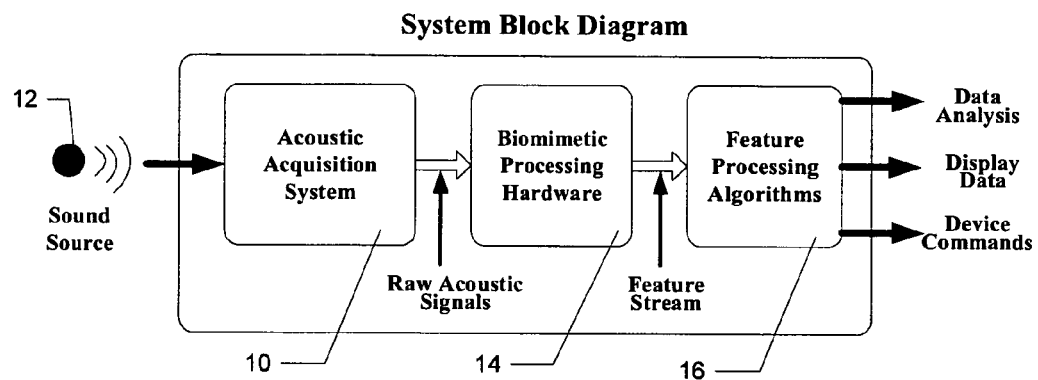
FIG. 1 is a block diagram of a biomimetic acoustic processing system in accordance with the present invention.

FIG. 1 shows a processing system using pairs of acoustic sensors to extract features and process them for specific tasks. The system itself has a parallelized processing scheme with three primary processing stages. The first stage is an acoustic acquisition system 10 which includes (i) a sensor array receiving sound from a source 12 and having a geometric sensor arrangement to optimize acoustic features for a given task, and (ii) basic signal conditioning to prepare the raw acoustic waveforms from the sensors as input to the hardware system. The second stage is a biomimetic processing subsystem (biomimetic processing hardware) 14 which includes a biomimetic preprocessor, a set of feature extractors which use pair-wise sensor inputs for inter-sensor time delay (ITD) and inter-sensor intensity difference (IID), as well as individual sensor periodicity processors (all described in more detail below). A set of feature processing algorithms 16 (also referred to as "feature binding") performs feature processing to estimate sound source position and to perform sound source classification. The feature processing algorithms 16 may include an application-specific decision matrix which utilizes the extracted position and classification information to drive external devices and display subsets of the analyzed data to system users, depending on the particular application of the biomimetic processing system.

The biomimetic approach uses mammalian physiology as a model for processing and extracting acoustic features. The processing involved in mammalian auditory systems is based on two ears or pairs of sensors. In the disclosed technique, the processing method employs pairs of sensors to acquire acoustic information for localization. The arrangement and geometry of the sensors is an integral aspect of acoustic acquisition and determines what acoustic features are available for extraction. The particulars of the sensor geometry are utilized within the feature processing algorithms 16 to classify and group features as part of "scene analysis", a task involving both identification and localization of sound sources.

Figure 2:
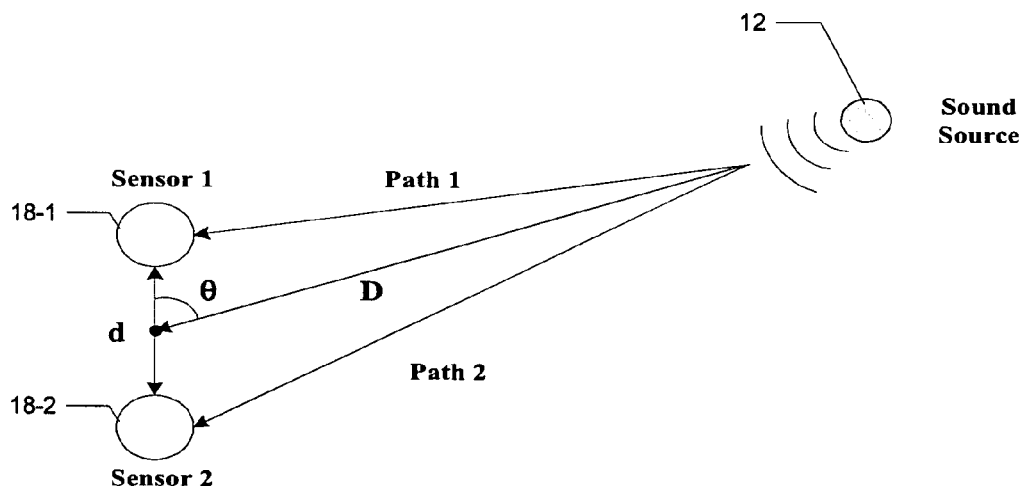
FIG. 2 is a schematic depiction of a sensor configuration usable in the system of FIG. 1 and illustrating the effect of differences in the paths from a sound source to the sensors.

With reference to FIG. 2 as an example, two sensors 18-1 and 18-2 may be placed some distance d apart creating a variable path length to the sensors 18 from any given sound source 12 based on its position in space. Assuming that the distance D to the source 12 is much greater than the separation d, the sound source 12 at any given position will have a difference in path length to the sensors 18 defined as d'=Path 1–Path 2. The angle from which the sound source emanates relative to the axis of the sensors 18, referred to as E, is equal to the arc-cosine of d'/d. The quantity d' can also be thought of in terms of time of arrival of the sound at the sensors, often referred to as ITD (inter-aural time delay). The relationship of ITD to d' is defined as ITD=d'/(Speed of sound).

Figure 3:
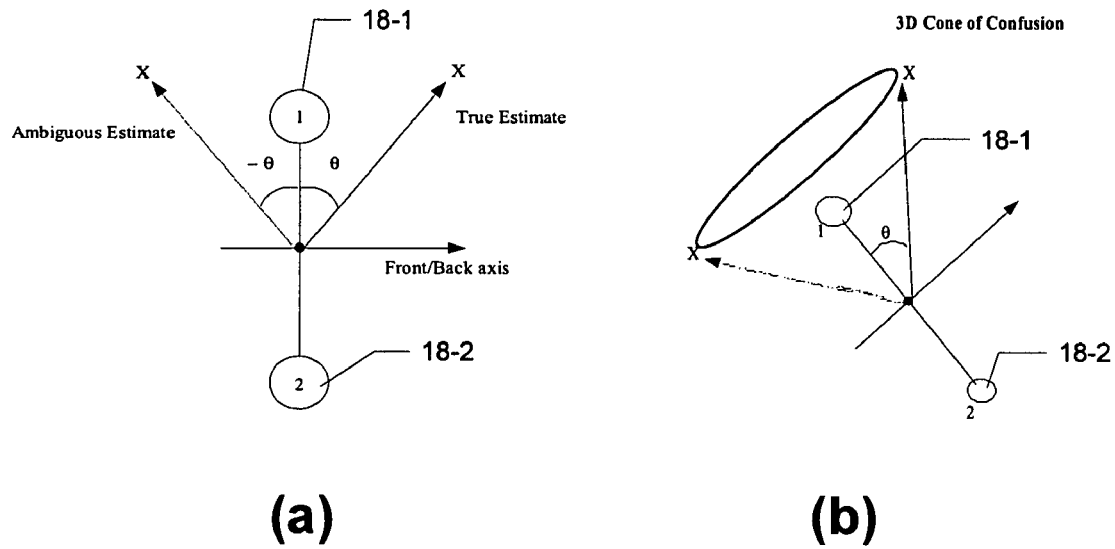
FIGS. 3-5 are schematic depictions of alternative sensor configurations usable in the system of FIG. 1.

Given any two-sensor arrangement in a two dimensional plane, there are two values of θ which produce the same ITD value, and thus for a given ITD value there is an ambiguity in position. This ambiguity is often referred to as 'front-back' ambiguity. One pair of sensors can therefore only provide a localization estimate in one planar dimension, for example azimuth, and that estimate will have a reflected ambiguity about the axis of the sensors. This situation is illustrated in FIG. 3(a). In the plane of the sensors, a V-shaped pair of lines defines points of equal ITD. If the estimates are extended to a three dimensional space, the V is rotated about the axis of the sensors to become a conical surface of points that all produce the same ITD. This surface is referred to as a 'cone of confusion' and is illustrated in FIG. 3(b).

To correct these dimensionally limited estimates and ambiguities, different numbers of sensors and different sensor geometries can be used. Although a biological system (e.g. an animal) may be limited to a pair of sensors, there is a biological strategy for obtaining an unambiguous estimate of sound source position in three dimensional space. Typically when trying to localize a sound, animals will change their head position several times. The position changes can be thought of as additional sensor pairs used to reduce the ambiguity in sound source location. Thus in the disclosed technique, additional pairs of sensors can be included as additional instantaneous 'looks' at the sound source. The initial geometry using a single pair of sensors 18 can extended to multiple sensor pairs. Orientation and arrangement of the additional sensors pairs is important to maximize new acoustic information.

Figure 4:
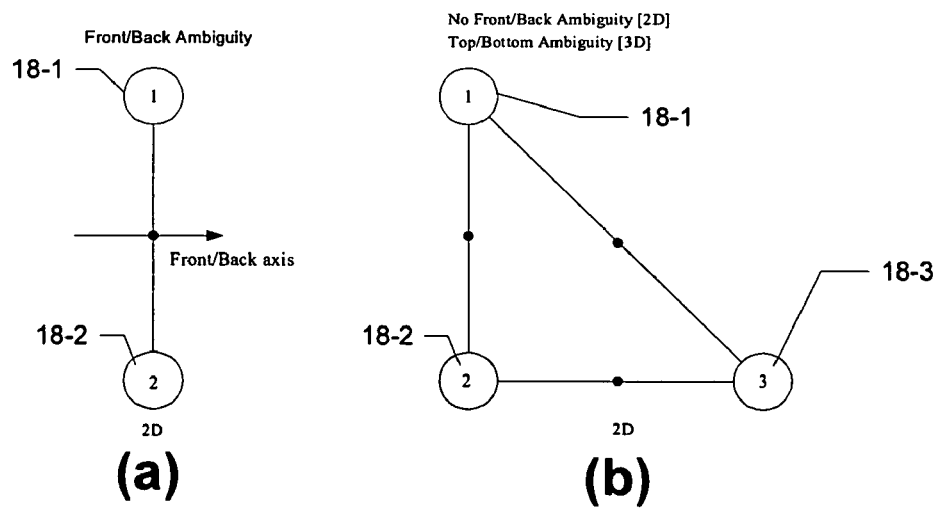

FIG. 4 illustrates a particular example of employing more sensors to reduce or remove ambiguity. As shown in FIG. 4(a), a single pair of sensors 18-1 and 18-2 produces an estimate in two dimensions with a front/back ambiguity in the direction orthogonal to the sensor axis, an ambiguity that extends to a cone in three dimensional space. Using three sensors 18 as shown in FIG. 4(b), the addition of a third non-collinear sensor 18-3 along the axis orthogonal to the original sensors 18-1 and 18-2 removes the front/back two-dimensional ambiguity, although there is still an ambiguity in three dimensional space. The addition of a single extra sensor such as sensor 18-3 adds two additional pairs with which to make estimates—pairs (18-1, 18-3) and (18-2, 18-3)—in addition to the original pair (18-1, 18-2).

Figure 5:
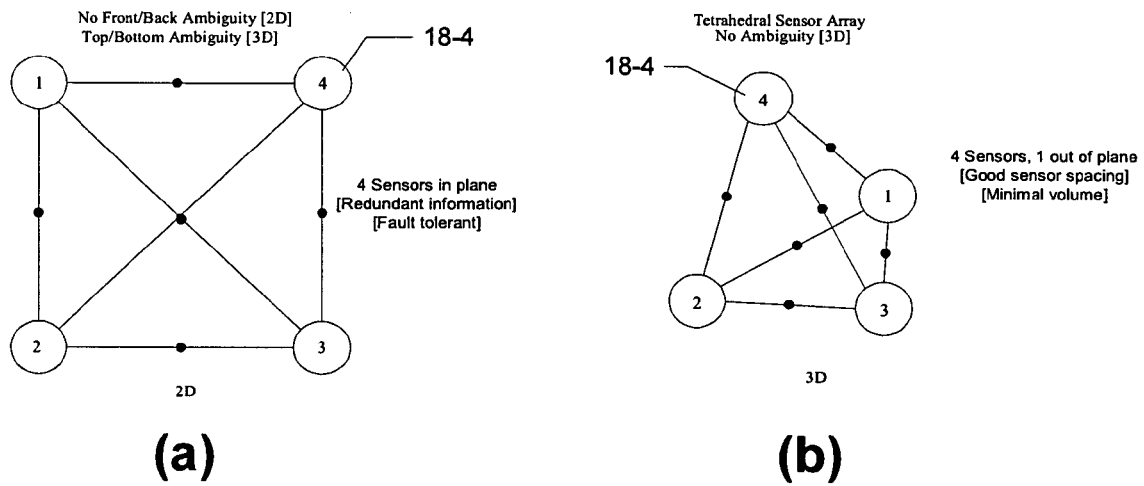

FIG. 5 illustrates additional examples of using additional sensors. A fourth sensor 18-4 may be added in-plane in the manner shown in FIG. 5(a), for example. Such an arrangement does not resolve the three dimensional ambiguity of the arrangement of FIG. 4(b), but given certain assumptions about the application will completely resolve the available positions in space. An in-plane sensor set such as in FIG. 5(a) is ideal for applications where low profiles are necessary, such as flush-mounted wall sensors or mountings that require aerodynamic design. For many flush-mounted applications, the acoustic space of interest is limited to one hemisphere (e.g., the hemisphere to one side of a wall), and therefore the application itself removes potential three-dimensional ambiguity. Four in-plane sensors also has the advantage of fault tolerance—any one sensor can be destroyed and the remaining system will function the same. Also, in environments having poor signal-to-noise characteristics, the additional sensor pairs help to improve signal levels. Placement of sensors in a two dimensional space may have other issues apart from resolving front-back ambiguity. Orthogonal axes are the ideal, but that does not constrain sensor location entirely. Dependent upon available space and the processing method used, distance between sensors should ideally be identical for processing purposes.

As shown in FIG. 5(b), one sensor 18-4 may be moved out of the plane of the other three, in which case the sensor set will have no ambiguity with any sound source position in three dimensional space. The out-of-plane sensor configuration requires that the sensor set occupy some volume as well as having all the constraints that exist from in-plane sensor sets. For many applications where out-of-plane sensor sets are required, a tetrahedral arrangement may be beneficial, as this arrangement can maximize sensor spacing given a certain volume, maintain equal spacing of all the sensors to maximize processing efficiency, and provide the desired orthogonal out-of-plane components.

When dealing with biomimetic feature processing, acquiring the source signal in a way that optimizes information in the features is very important for the function of the system. In the case of auditory processing, there are four basic features which include, but are not restricted to:

1) Spectral content (the various frequencies that make up a signal) [monaural cue]
2) Interaural Time Delay or ITD [binaural cue]
3) Interaural Level/Intensity Difference (ILD/IID) as well as spectral notches [binaural cue]
4) Pitch/Periodicity cues [monaural cue]

All of these cues are useful for acoustic source identification and or localization, although the exact mechanisms by which these cues are extracted and utilized in biological systems are still a topic of great debate and are by no means obvious or well explained. Sound source localization and identification are not mutually exclusive, and in a biomimetic context, can be synergistic cues. Sound location helps to segregate sound sources which improves identification, and identifying a sound source also helps to distinguish it from others, which in turn can improve localization.

Typically, binaural cues are used primarily for localization, and monaural cues primarily for identification. Binaural cues require two receiving sensors, while monaural require only a single receiver. An important distinction in the biomimetic approach to processing is that it uses pair-wise sensor information when dealing with localization tasks. Arrangements with multiple sensors are taken by pairs and are put in a context of biological behaviors and methods used in biological systems to solve acoustic problems.

Given these features and a pair-wise arrangement of sensors, with a minimum number of sensors generally being both the most cost effective and desirable design, the methodology for designing a sensor geometry for any given application takes into account three major constraints:

1) Properties of the acoustic sound source
2) The acoustic environment in which the sound source is to be identified/localized
3) The form factor of the application, available size shape constraints When considering an acoustic sound source there a several properties which are considered when designing a sensor geometry:

1) The frequency content (affects overall size for good sensitivity)
2) The freedom of position of the sound source, i.e. a 2D space or 3D space or a confined sub-region of space (affects sensor placement to avoid ambiguities)
3) Is the sound source transient (e.g. gun shot) or persistent (e.g. vehicle) (affects pre-amplification and pre-filtering of acoustic signals)
4) The dynamic range of the signal, i.e. what range of signal levels can be expected in the application (affects the type of pre-amplification and pre-filtering of acoustic signals)

When considering the acoustic environment for operation there are also several factors which will affect geometry design, these include:

1) Is the application based in air or water
2) Is the environment highly reverberant (e.g. urban center with many reflectors or shallow water)
3) Background noise (e.g. wind noise, animal vocalization, vehicle noise, weapon fire etc.)
4) Is the application mobile and will the environment cause motion related artifacts (e.g. sensors are mounted on a HumVee which will operate while moving)

One of the most stringent constraints on design is the size and form factor of the application. When possible, certain aspects of the application physical structure are arranged to enhance acoustic features these include:

1) The shape of the base on which the sensors are mounted—platform shape can increase resolution of ITDs, ILDs, and spectral notches
2) The size of the application—for any given application a larger size will improve localization
3) The spatial resolution required, i.e. does the application need to have accuracy in three dimensions and does the available space to mount the sensors allow for 3D localization Several example applications are described below with corresponding considerations for sensor placement.

It should be noted that in addition to the various sensors 18, the acoustic acquisition system 10 of FIG. 1 may also include analog pre-amplifiers as a form of pre-processing circuitry. It may be desirable to filter undesired acoustic signals such as wind noise and to limit the dynamic range of the signal in a manner that does not cause severe spectral splatter. Pre-amplifiers using soft saturating diode circuits can be utilized to add significant dynamic range to the acoustic sensor array while minimizing spectral splatter.

Figure 6:
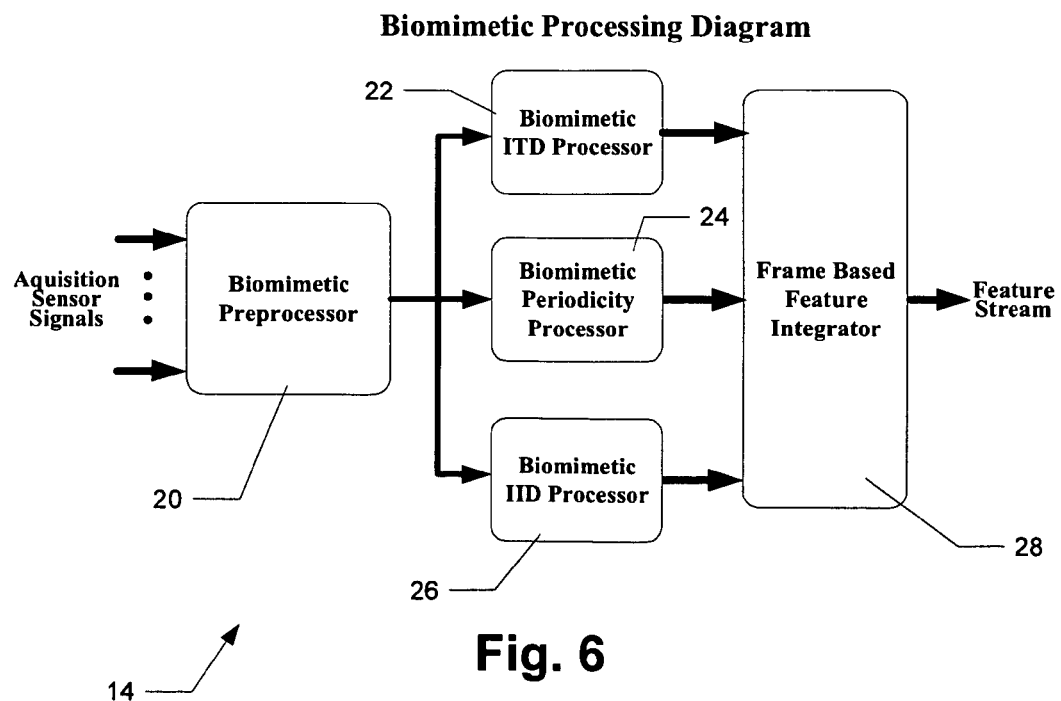
FIG. 6 is a block diagram of a biomimetic processing sub-system in the system of FIG. 1.

FIG. 6 shows an exemplary biomimetic processing subsystem 14. Several components perform parallel processing of the acoustic sensor signals to extract localization and sound source identification features. The raw acoustic signals (acquisition sensor signals) are taken from the acquisition system 10 and used as input to the biomimetic processing subsystem 14. The output of each sensor 18 is run through a dedicated biomimetic preprocessor 20 and the resulting signals are distributed to various feature extracting modules, which include an inter-sensor time delay (ITD) processor 22, a periodicity processor 24, and an inter-sensor intensity difference (IID) processor 26. The ITD processor 22 and the IID processor 26 require pair-wise sensor inputs, while the periodicity processor 24 works on the individual sensor signals. In the illustrated embodiment, all three processors 22, 24 and 26 are utilized, but alternative embodiments may employ any one or any pair of such processors as dictated by system requirements. The outputs of the processors 22, 24 and 26 are provided to a frame-based feature integrator 28 which generates a "feature stream", i.e., a stream of higher-level features that have been identified by the biomimetic processing.

Figure 7:
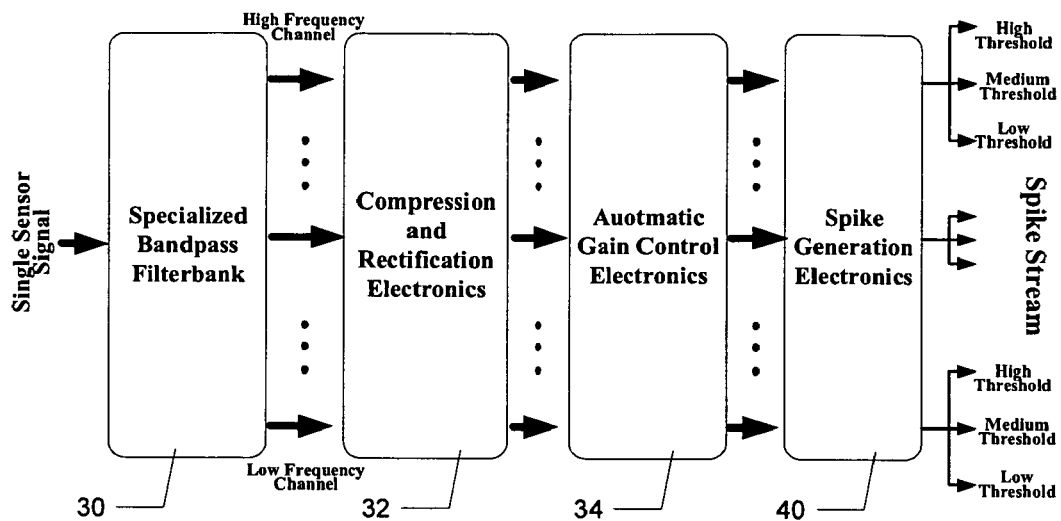
FIG. 7 is a block diagram of a biomimetic preprocessor in the biomimetic processing sub-system of FIG. 6.

FIG. 7 shows the biomimetic preprocessor 20, which takes in the raw acoustic signal from an individual sensor 18 and generates an array of outputs which are specialized conditioned signals representing temporal and spectral components of the acoustic signal. Each sensor 18 has one dedicated preprocessor 20 which generates a stream of pulsatile events be referred to as 'spikes', reminiscent of the biological action potentials generated by nerve fibers. Each preprocessor 20 as a unit is intended to replicate in a simplified form the essential processing performed by mammalian cochlea preconditioning the acoustic signals for other physiological based processing algorithms.

The first component of the preprocessor 20 is a filter bank 30 with characteristics designed to roughly match frequency properties of individual auditory nerves seen in mammalian physiology. The filter bank 30 consists of an array of bandpass filters each having a different center frequency (CF). The CFs of the bandpass filters are distributed logarithmically over the application specific frequency range. In illustrative embodiments, there may be between 16 and 64 bandpass filters. Each filter has a fixed bandwidth to center frequency ratio (referred to as Q 3 dB) preferably in the range of 3 to 10. The filter implementation can vary dependent upon space and power constraints. Typical implementations use resonant second order filters in conjunction with a high pass filter set approximately a quarter of an octave below the CF. An alternative design uses a cascade of second order filters which difference adjacent filter outputs to create bandpass filters with auditory like properties.

Each bandpass filter in the filter bank 30 generates an output stream that is referred to as a 'frequency channel' representing an instantaneous estimate of spectral content in an acoustic signal over the corresponding bandwidth. The filter implementations are not particularly crucial to the design; the important components of the design are the distribution of CFs and the approximate Q of the filters in order to produce frequency channels with proper characteristics to represent the spectral content of the acoustic signal. For localization, a relatively low Q in the range of 3 to 6 is good. The overall bandwidth of the set of filters depends on the application. For sounds such as mortar fire that are concentrated in lower frequency bands, the filters may span the range of 100 Hz to 1 kHz, whereas for higher-frequency sounds such as gunshots, a band from 100 Hz to 8 kHz may be desirable. The parallel structure of frequency channels is the basis of all of the processing that occurs in the biomimetic processing subsystem 14, and the frequency channel dimension is maintained and represented in all the following stages of processing.

The frequency channel information from the bandpass filter bank 30 is passed into compression and rectification electronics 32 maintaining the parallel frequency channels from the filter bank. In an exemplary embodiment, the compression and rectification electronics 32 are identical for all of the frequency channels. The electronics consist of a log amplifier followed by soft rectifying circuit and low pass filter. The properties of the compression and rectification electronics are preferably designed to mimic hair cell transduction properties seen in the mammalian auditory system. The advantages of this processing stage are essentially two fold. First, the dynamic range over which the system can operate is increased, and second, the overall bandwidth of the signals being represented is decreased while maintaining a representation of the spectral content, even of high frequency signals.

Automatic gain control (AGC) circuitry 34 is an important part of the preprocessor 20. The AGC circuits 34 take the compressed and rectified signals and perform an additional stage of signal conditioning to emphasize specific aspects of the amplitude information in each frequency channel, in particular the onset and offset of sound sources. For low frequency information such as low frequency pure tones and slowly varying envelope information for high frequency signals, the gain control circuits 34 tend to emphasize the rising edge of the acoustic waveform producing markers for the phase of the information, something akin to 'glints' in sonar signals. These circuits perform several roles including increasing system dynamic range, maintaining optimal operating points for spike generating circuits in loud ambient noise environments, and also a certain level of reverberation tolerance through short term signal adaptation.

Figure 8:
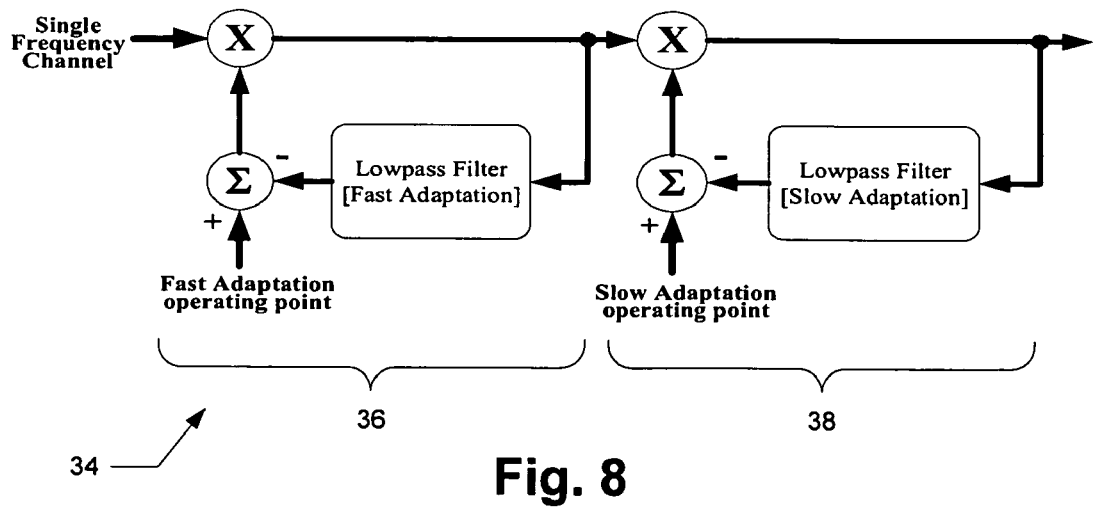
FIG. 8 is a block diagram of an automatic gain control circuit in the biomimetic preprocessor of FIG. 7.

FIG. 8 shows a block diagram of an AGC circuit within the AGC circuitry 34. The AGC circuit is a highly nonlinear circuit which attempts to maintain a certain operating point over a wide range of signal levels. A cascade of AGCs are used to replicate the processing properties of neurological synapses using different operating points and different adaptation time constants. A first AGC 36 in the cascade has a fast adaptation time constant in its feedback loop, while a second AGC 38 has a slower adaptation time constant. The combination of fast and slow adaptation emphasize fast transients and signal onsets (e.g. on the order of 1 ms) while suppressing multiple transients and longer term variations that are often associated with reverberant environments (e.g. on the order of 30 ms or greater). The output of the AGC circuits 34 carries band-limited information from each frequency channel emphasizing transients and signal onsets or offsets as well as marking phase information for low frequency signals.

Referring back to FIG. 7, the output from the AGC circuitry 34 is used to drive spike generating circuits (electronics) 40, which consist of three separate circuits per frequency channel, each of which generates a pulsatile stream of data. In an exemplary embodiment, the three circuits have nearly identical layout and construction with the exception of the voltage threshold at which they trigger. A low-threshold circuit triggers easiest and at the lowest sound levels; a medium-threshold circuit triggers at higher sound levels; and a high-threshold circuit triggers at the highest sound levels. Thus, each frequency channel is further divided into three sub-channels of different signal intensity ranges. The combination of these three circuits extends the dynamic range of the system and broadens the range over which critical sound features can be encoded, as explained in more detail below.

Figure 9:
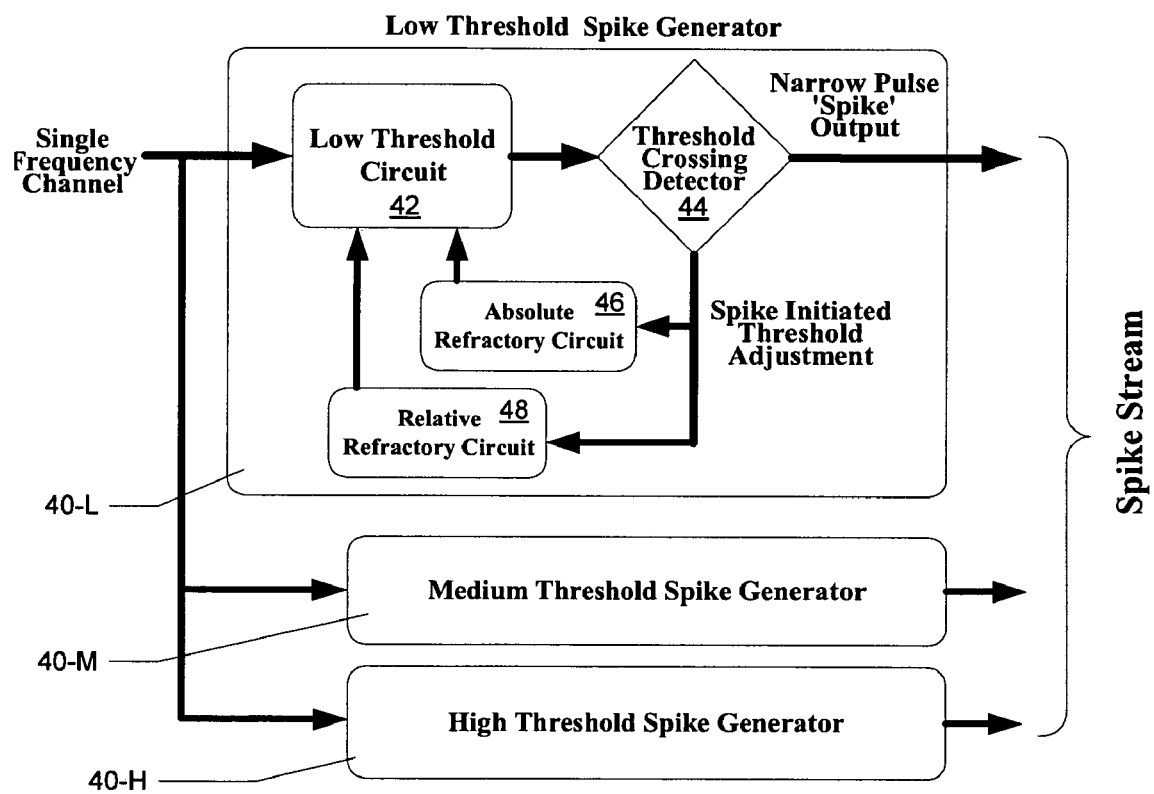
FIG. 9 is a block diagram of spike generator circuits in the biomimetic preprocessor of FIG. 7.

FIG. 9 shows a block diagram of the set of three spike generator circuits 40-L, 40-M, and 40-H for a single frequency channel. Each spike generating circuit consists of a threshold circuit 42, a threshold crossing detector 44, an absolute refractory circuit 46, and a relative refractory circuit 48. The threshold circuit 42 performs a voltage comparison of the signal input to a reference value which is set relative to AGC operating points. The low threshold circuit 40-L has a reference value approximately 20% above the quiescent AGC circuit output, which is slightly above ambient noise level; the medium threshold circuit 40-M has a reference value set 10% above the maximum saturated steady state AGC output; and the high threshold circuit 40-H has a reference value that is roughly 40% of the maximum peak AGC output. The combination of these three circuits extends the dynamic range of the system and broadens the range over which critical sound features can be encoded. The selection of reference values is important to the process to optimize not only the variation in information carried in each circuit, but also the quality of features encoded. Setting a reference value too close to the saturated AGC operating point will result in poor temporal feature extract, and setting a reference value too high relative to the peak AGC response will result in a circuit that will only respond to the onset of loud sounds in quiet environments. The above reference values have been shown through simulation to produce robust features over a broad range of acoustic conditions.

The refractory circuits 46 and 48 are used to regulate the threshold reference values as spikes are produced. Once a threshold circuit 40 has been activated, a narrow pulse of high voltage is generated and sent into a hardwired spike stream which can directly interface with digital hardware without an A/D interface. At the same time, the refractory circuits 46 and 48 are activated and drive up the reference values for the activated circuit. The absolute refractory circuit 46 temporarily sets threshold above maximum possible voltage levels in order to turn off spike generation. The relative refractory circuit 48 raises threshold levels to roughly 75% of the maximum voltage after the absolute refractory circuit 46 turns off, and then permits the threshold level to decay back to the initial reference value with a specific time constant on the order of 1-3 milliseconds. The refractory circuits 46 and 48 add a kind of hysteresis to the spike production process, reducing sensitivity to noise and ensuring good isolated production of spikes. The concept of generating spikes is taken from neurological systems and has a dual role in the system. First the spike generation is used as a method of marking 'events' in acoustic signals which can be anything from the onset of a sound to a particular phase of a low frequency signal. The second role is to convert high bandwidth information contained in the acoustic signals into low bandwidth signals that are easily interfaced with both digital processing and event based processing. The combination of the AGC cascade 36, 38 and the spike generation circuits 40 are critical for generating spikes which mark temporal features in the acoustics signals for biomimetic processing strategies.

Figure 10:
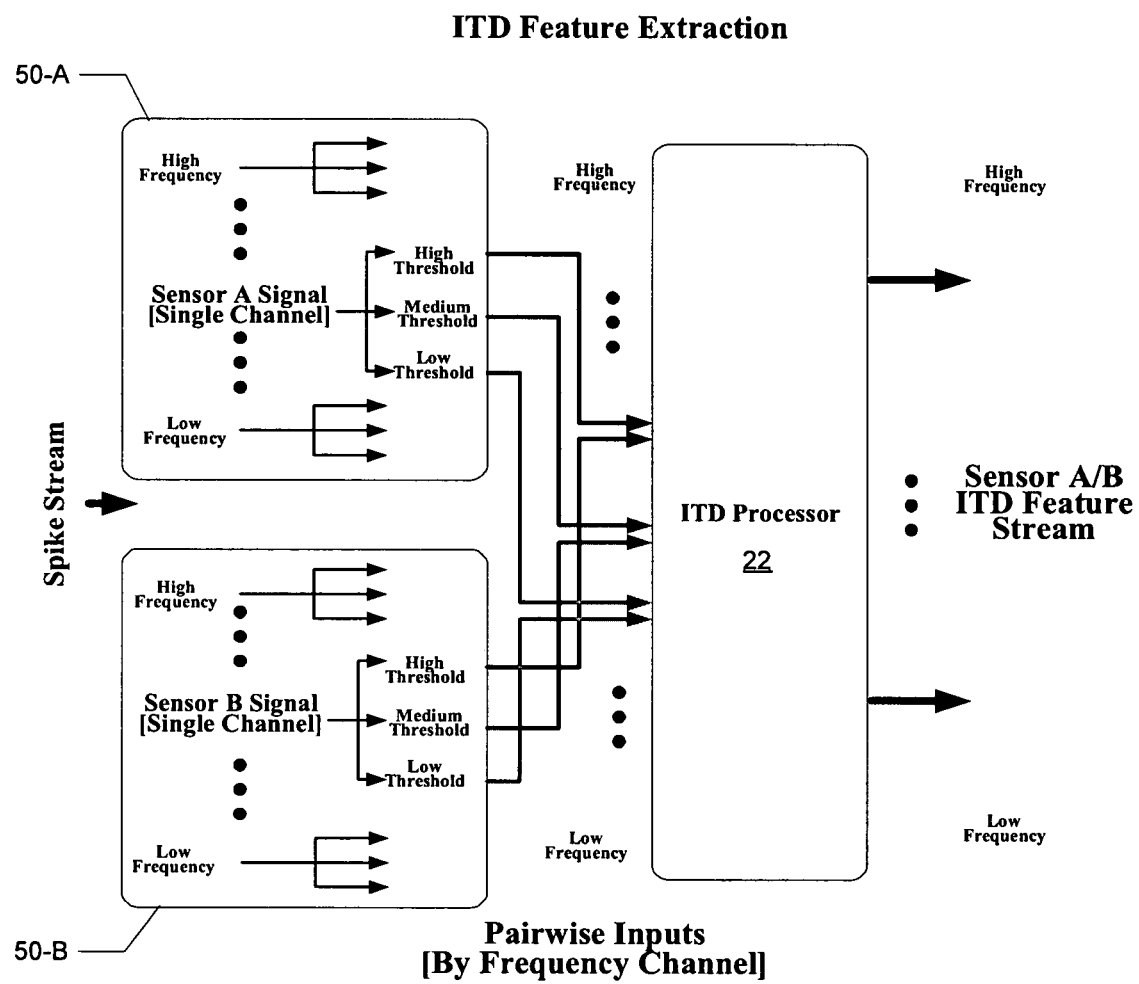
FIG. 10 is a schematic depiction of inter-aural time delay (ITD) processing in the system of FIG. 1.

FIG. 10 shows the general structure of biomimetic ITD processing. For ITD feature extraction, the spike streams generated by the preprocessor 20 for each sensor 18 are combined pair-wise, comparing spikes from the same frequency bands and thresholds across a pair of sensors 18. Blocks 50-A and 50-B identify the respective sets of preprocessor output signals for two sensors A and B. The combining is depicted by the grouping of inputs to the ITD processor 22, in which every signal pair for the two sensors A and B is routed to a counter circuit which looks for inter-spike timing intervals population by population. The large number of parallel pairs of inputs are simultaneously processed through the ITD processor 22 creating a sensor pair ITD feature stream.

Figure 11:
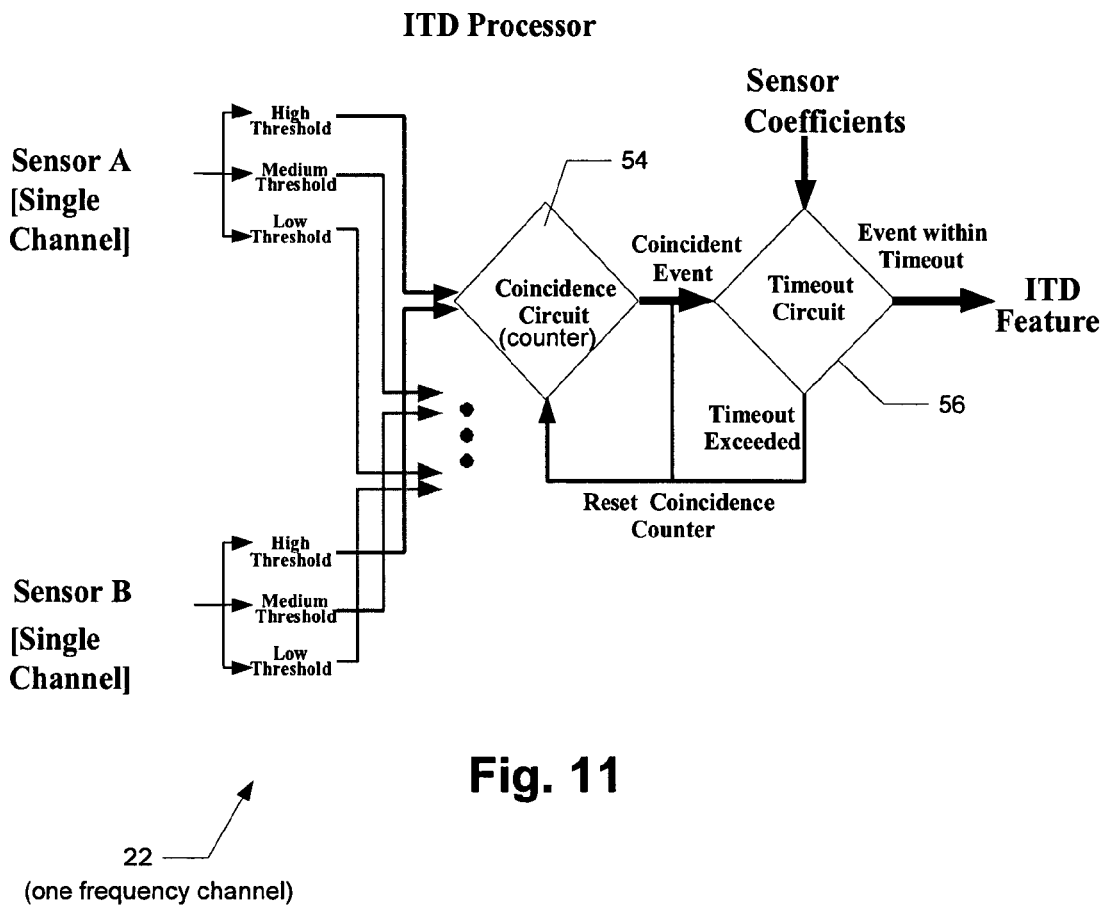
FIG. 11 is a block diagram of an ITD processor in the biomimetic processing sub-system of FIG. 6.

FIG. 11 illustrates one frequency channel of the ITD processor 22 for a pair of sensor signals. For each of the three thresholds in each frequency channel, the ITD processor 22 includes a specialized counting circuit that generates an accurate estimate of the inter-sensor time delay of the sound source wave front based on the physical position in space of the sound source. Each spike population (low, medium, and high threshold) has a cross-sensor spike counting circuit which looks for pairs of spikes occurring within a small time window of each other.

Specifically, pairs of identical CF and threshold spike streams from two sensors 18 are run into a coincidence circuit 54 which in effect acts as a counter. An incoming spike for one sensor of the pair triggers the counter 54 to begin waiting for a spike from the other sensor of the pair. When a second spike occurs, a timeout circuit 56 checks to see if a sensor-geometry-specific time window has been exceeded. If the spike pair occurs within the timeout window, an ITD event is generated, and if not, no event is generated and the counter 54 is reset. This same circuit is used for every CF/spike threshold sensor pair.

There is one ITD feature from the ITD processor 22 for each combination of frequency channel, sensor pair, and threshold. Thus, in an embodiment having ten channels, three thresholds, and three sensor pairs, for example, there are 90 ITD features. The ITD features are combined to derive an indication of the direction of one or more sound sources, which may be a three-dimensional indication if an appropriate sensor geometry is employed. Within each channel, the signals from each threshold are combined in a weighted fashion to realize the desired wide dynamic range, as described above. The signals from different frequency bands are weighted to improve overall signal-to-noise ratio, with the weighting scheme being tailored to the application. The output(s) for each sensor pair provide an indication of the "cone of confusion" for that pair, and if more than two sensors are utilized, the outputs for the different sensor pairs can be combined to find "intersections" of the cones, removing the spatial ambiguities.

Figure 12:
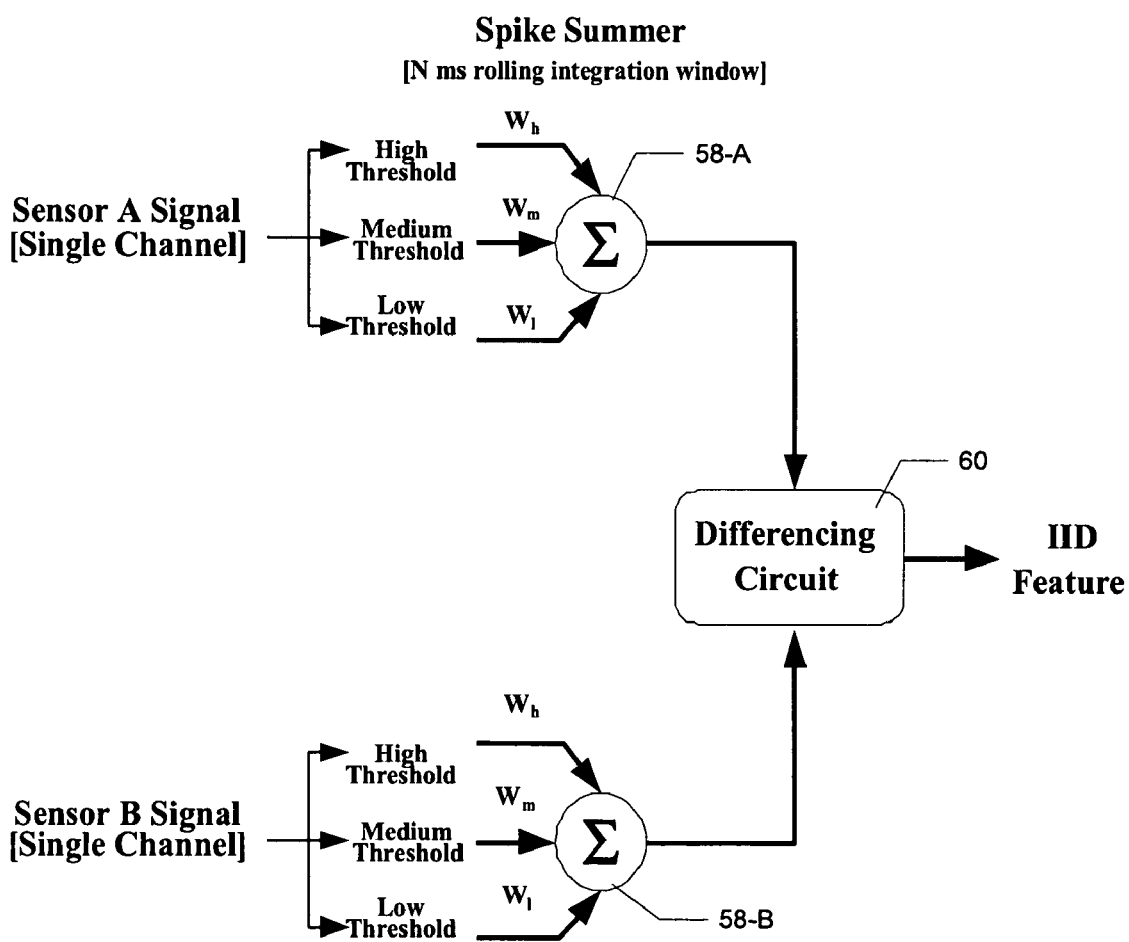
FIG. 12 is a block diagram of an inter-aural intensity difference (IID) processor in the biomimetic processing sub-system of FIG. 6.

FIG. 12 illustrates the biomimetic IID processor 26 of FIG. 6. The illustrated circuitry is repeated for each frequency channel and sensor pair. The spikes from all spike populations (high, medium and low thresholds) are added together in a respective adder 58 (58-A for sensor A, 58-B for sensor B), and each sum is provided to a differencing circuit 60 to compare the sums for the sensor pair/frequency band.

Figure 13:
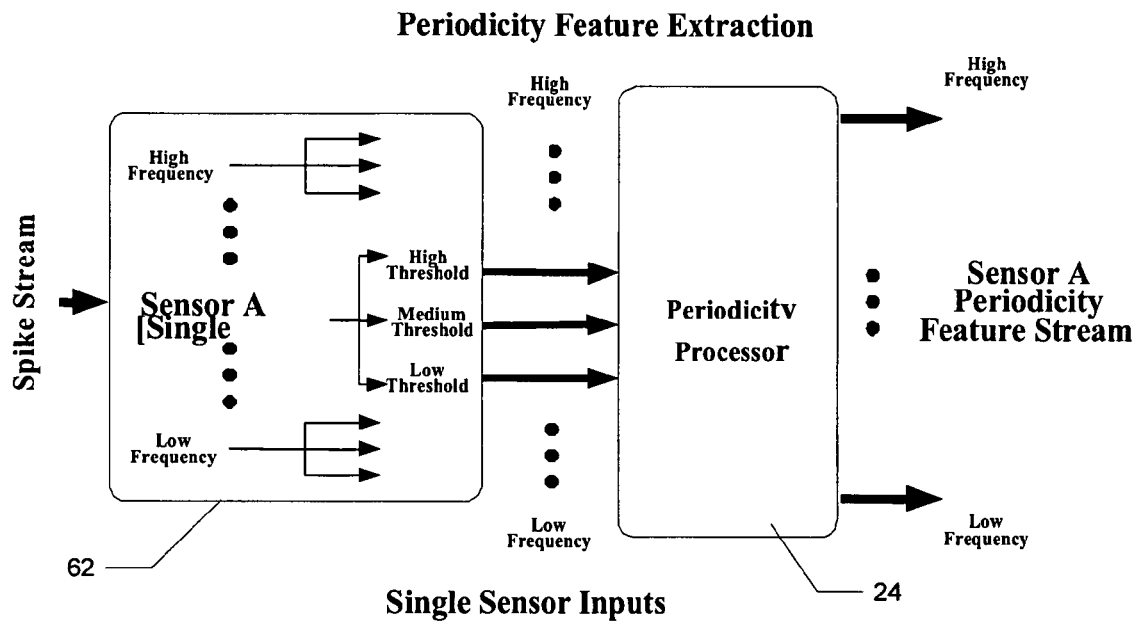
FIG. 13 is a schematic diagram depicting periodicity processing in the system of FIG. 1.
Figure 14:
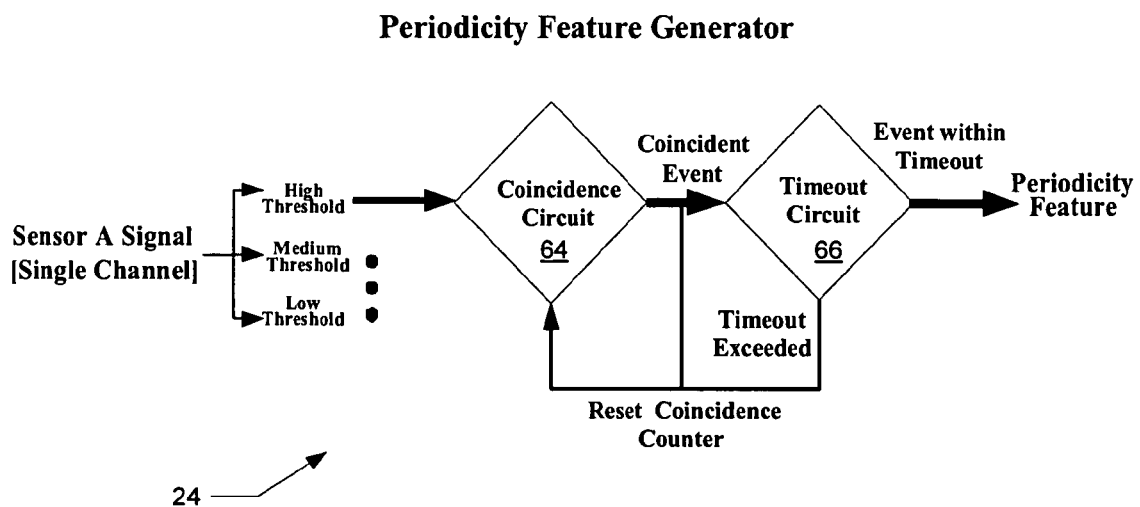
FIG. 14 is a block diagram of a periodicity processor in the biomimetic processing sub-system of FIG. 6.

FIG. 13 illustrates periodicity feature extraction. The block 62 illustrates the selection of input signals for a single sensor (e.g. sensor A as shown). Thus the periodicity processor 24 for a given sensor includes circuitry repeated for each frequency channel and threshold. This circuitry is shown in FIG. 14, and includes a coincidence circuit 64 and timeout circuit 66. This circuitry operates in a manner similar to the ITD processor circuitry of FIG. 11, except that it measures intervals between temporally adjacent events for a single sensor, rather than intervals between events for a pair of sensors.

In many cases, downstream processing can choose the spike stream having the highest intensity for processing, improving signal-to-noise ratio. In other cases, one or more spike streams may have a higher signal-to-noise ratio than the highest-intensity stream, for example due to shadowing effects based on sensor placement and noise source location. In these cases, it makes sense to select such higher-signal-to-noise channels.

Figure 15:
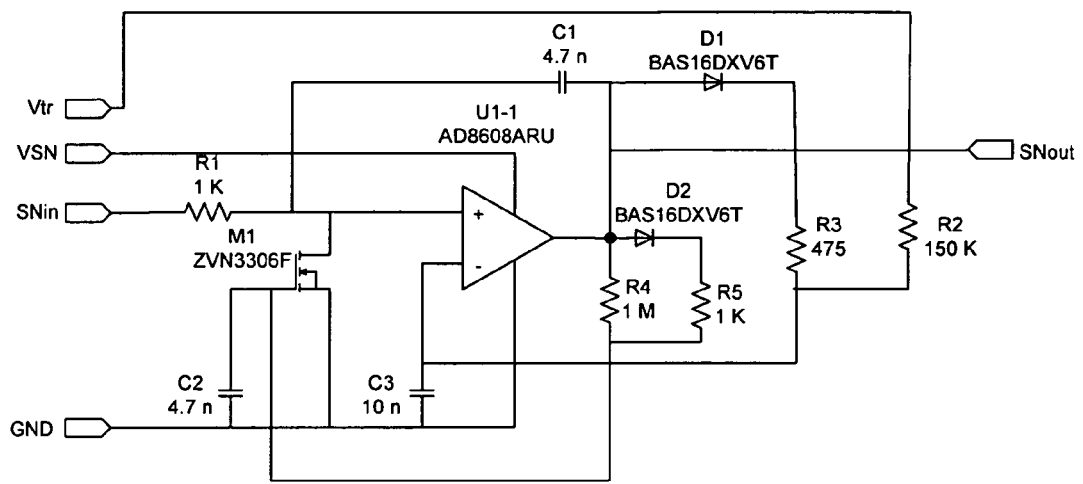
FIG. 15 is a schematic diagram of an implementation of a spike generator circuit such as shown in block form in FIG. 9.

FIG. 15 shows a detailed implementation of a spike generator 40. The input Vtr is responsible for establishing the threshold (high, medium or low). A comparator U1-1 corresponds to the threshold crossing detector 44 of FIG. 9, with the remaining circuitry implementing the threshold circuit 42 and refractory circuits 46, 48.

Figure 16:
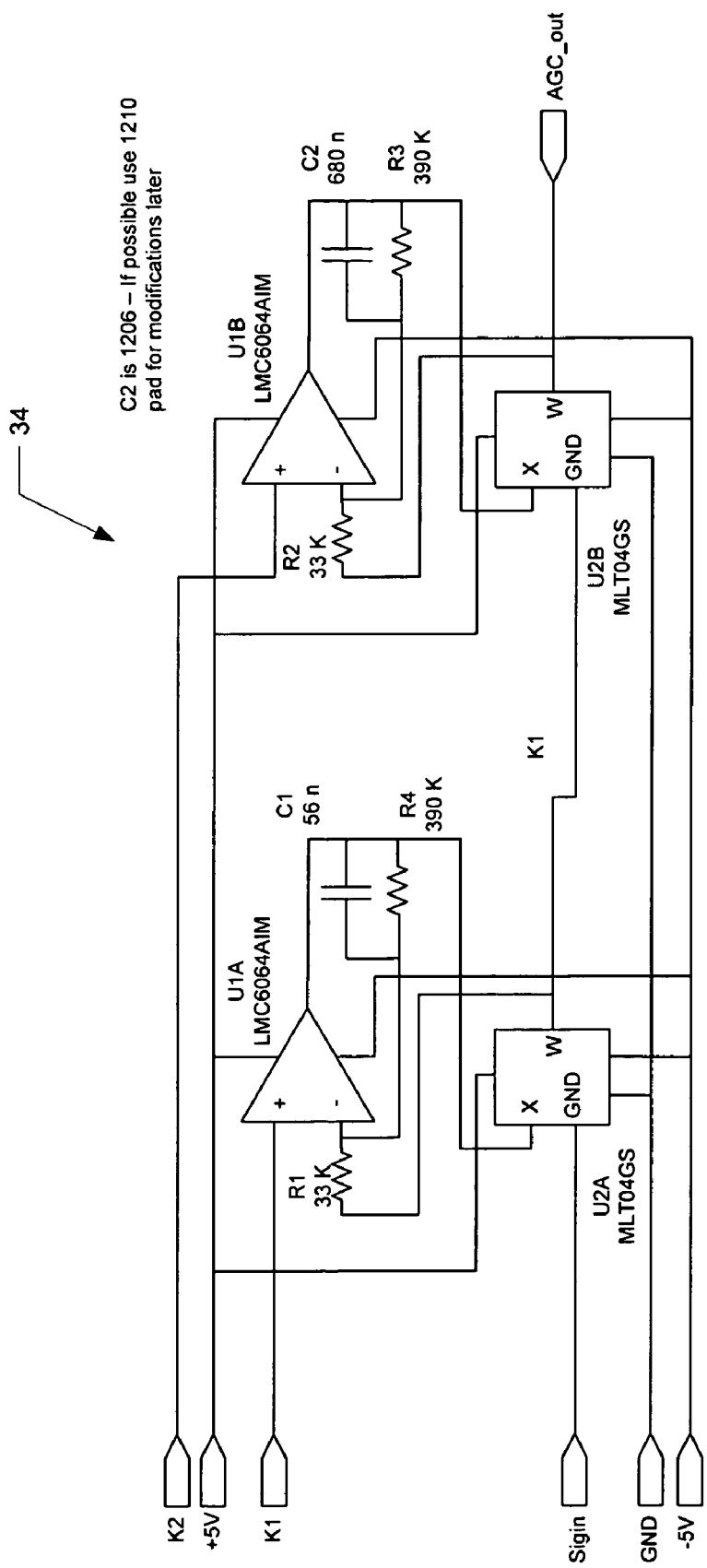
FIG. 16 is a schematic diagram of an implementation of an automatic gain control circuit such as shown in block form in FIG. 8.

FIG. 16 shows a detailed implementation of an AGC circuit 34. An amplifier U1A and surrounding circuitry correspond to the fast-adaptation circuitry 36 of FIG. 8, and an amplifier U1B and surrounding circuitry correspond to the slow-adaptation circuitry 38 of FIG. 8.

Figure 17:
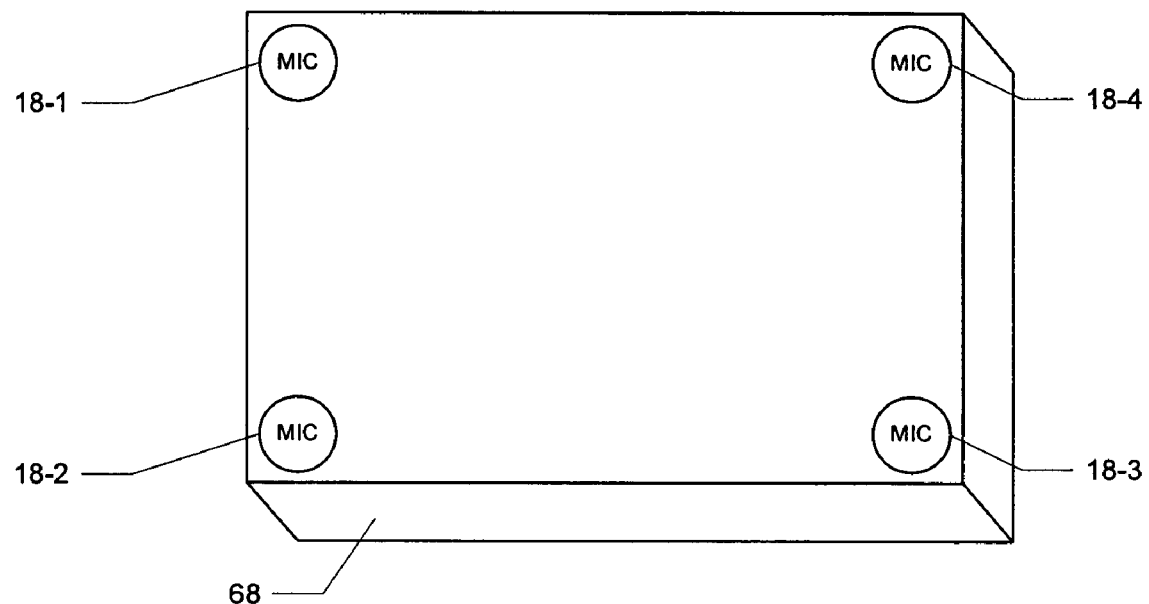
FIGS. 17 and 18 are perspective views of an embodiment of an enclosure for the system of FIG. 1 for a mounted mobile application such as on a mobile robot.
Figure 18:
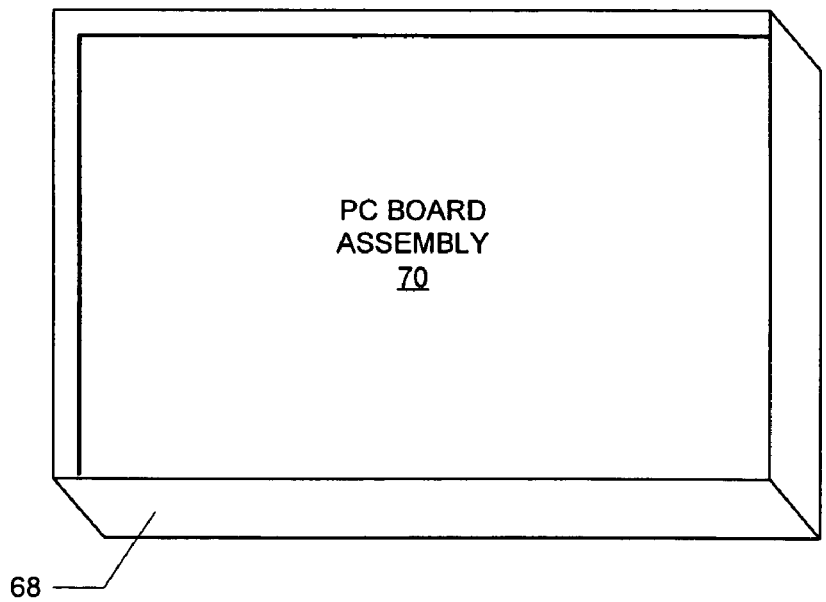

FIG. 17 shows a top perspective view of a housing or enclosure 68 that may be used to contain a biomimetic processing system such as that of FIG. 1. In the illustrated embodiment, four sensors 18 are located in respective corners of the top of the enclosure 68, a sensor configuration corresponding to that of FIG. 5(a). FIG. 18 shows a perspective bottom view with the bottom cover removed to show a printed circuit (PC) board assembly 70 mounted within the enclosure 68. The PC board 70 contains the various electronic components that constitute the system of FIG. 1, i.e., components that make up the acquisition system 10, biomimetic processing hardware 14, and feature processing algorithms 16. The enclosure 68 may be particularly well suited for a mobile-mounted application such as on a mobile robot.

As noted above, there are a variety of potential applications for a biomimetic processing system of the general type illustrated in FIG. 1. Several specific applications are described in some detail below.

Application 1: A Mobile Study Apparatus for Frog Populations Using Breeding Calls A specialized acoustic apparatus may be used to examine frog populations, which are environmentally sensitive species and good indicators of environmental health, by using a sensor system to localize and count breeding adults by their calls. The calls are known to be restricted to a small frequency range, the individual animals will all be within the confines of the pond and at its surface, the individuals are territorial and do not move often, the calls will be transient, and the range of signal level will cover roughly 40 dB. The sensor platform must be small, lightweight, and portable to reach remote areas.

Given the sound sources are restricted to the planar surface of the pond which is a subset of the 2D planar space, only a single pair of sensors is sufficient to resolve location of the sound sources. To maximize the ITD and ILD cues created by the sensor housing, cubes were chosen. Cubes are simple to fabricate, it is easy to orient the sensors with respect to a target area, and although impossible to characterize with closed form mathematical solutions, empirically they produce larger and more distinct ITD patterns (generally known but never formalized in the literature, extremely difficult to prove mathematically). If higher resolution and or ranging information is required two small cube arrangements can be networked and individual pair estimates can be used to triangulate sound sources.

Application 2: A Mobile Reconnaissance Robot

Autonomous vehicles and mobile robotics have become useful tools in battlefield situations removing soldiers from dangerous situations and gathering useful intelligence. Many of the tasks these field robots are required to perform either require or are greatly facilitated by acoustic detection and localization of various sound sources such as sniper fire or incoming mortar rounds. One of the more successful pieces of equipment in recent military scenarios has been the Explorer Packbot produce by Irobot fitted with a dense array of zooming optical devices. In order to focus these optical devices such as thermal zoom cameras on proper targets when conditions are at their best for a given problem, for example the moments immediately after a sniper shot to capture the thermal bloom of the muzzle blast, an acoustic localizer is essential. There are several challenges for choosing sensor placement on an Irobot platform.

The physical structure of the vehicle limits the maximum spacing of the sensors, there is also significant noise from motors and interfering magnetic fields from drive motors that limit the location of sensors. Because the applications are also low to the ground, issues such as ground bounce often interfere with the most useful acoustic cues. Sensor placement was chosen as high up on the vehicle as possible, on top of the vehicle sensor head, the physical head itself is used as an acoustic shield from motor noise and ground bounce. Packbot Explorer sensor heads are square by design, so sensors are placed in the corners of the head mounted nearly flush to the surface with a slight tapering collar. The flat surface of the head has ambiguity with regard to position in the upper and lower hemispheres of 3D space, but for almost all situations the vehicle with a low tactical head height only has possible sound source positions in the upper hemisphere of space. The corner mounts optimize the available space and offer several options for detection schemes. Because these robot operate in high noise, high risk environments, sensor redundancy is important not only for increasing signal to noise performance, but also to maintain function in case of sensor damage. A square arrangement of sensors allows for a more task-configurable usage of sensors: diagonal corners can be used when larger spacing is desired, T-structures can be used if a single sensor is damaged with minimal changes to processing, or combinations of all microphone pairs can be used in high noise environment to improve signal when computational resources are available.

Application 3: A Helmet Based System for Sniper Detection

As part of the Force warrior concept, individual soldiers are being fitted with the latest high tech equipment to enhance performance in battlefield conditions. A problem most soldiers face in field conditions is a loss of directional information because of helmets obscuring acoustic cues which normally would be used to localize sound sources. Acoustic sensors mounted in the surface of the helmet can be used to gather these acoustic cues and produce sound source position estimates which can be provided to the soldier through the visual display systems integrated into the next generation of helmets.

Helmet based applications have a constraint of size, but also have the additional complication of geometry. Many studies of geometric models from people such as Kuhn (1979) and others have shown that the geometry of a body between two acoustic sensors can greatly increase the ITD values obtained at the two sensors, and there by increase the angular resolution to which a sound source position can be determined. To a first approximation a helmet can be modeled quite well as a sphere, ideally sensors should be spaced as far apart as possible on the sphere for best performance. However, the helmet is not a sphere in that the bottom half must be open to accommodate the wearer. The best spacing with that constraint is bounded by a tetrahedral arrangement with the flat bottom surface facing the ground. This arrangement optimizes the sensor spacing condition while providing a roughly symmetric arrangement for post processing. Because of the mobility of the soldier and the variety of position a soldier make assume in the field resolution of sound sources in 3D space is required, this condition is also met by the tetrahedral arrangement.

Application 4: A Wall-Mounted Acoustic Tracking System

For additional security and surveillance in commercial applications, it is useful to have acoustic tracking technology work in conjunction with video cameras and other equipment with limited directional capabilities. Acoustic systems can be used to track sound sources and guide other equipment to the sound source to minimize 'holes' in sensor networks. Acoustic technologies will also function in conditions where optical equipment would fail such as high or low light conditions. Acoustic sensors can also be much less intrusive than other kinds of sensors and draw far less power, they can be used as a first line of security alerting other sensor systems to activate.

Application 5: A HumVee Mounted Acoustic Monitoring System

The HumVee is a vehicle that is often placed in high risk areas where localizing sniper fire or the direction of incoming mortar rounds would be extremely advantageous. The vehicle itself is a large noise source that can interfere with localizing a sound source. Sensor placement needs to be as far from engine and exhaust noise as possible, the best position being the roof of the vehicle. The height and position on the roof uses the vehicle as a shield for ground bounce as well as vehicle generated noise. The vehicle also is capable of traveling at relatively high speeds and makes wind noise and vehicle vibration an issue. The large area provided by the vehicle roof allows for large sensor spacings and for sensor casings large enough to accommodate vibration damping materials and windscreens. A square arrangement of sensors provides localization accuracy in the upper hemisphere of space around the vehicle which is sufficient for most vehicle conditions. The square arrangement also allows for sensor damage where any single sensor can be removed and the remaining three will provide accurate estimates.

Application 6: An Underwater System for Monitoring Dolphin Pod Behavior

Monitoring dolphins in the wild is a difficult task, but is best accomplished using acoustic methods. Undersea environments do not lend themselves to video surveillance because of the rapid fall off in light intensity, but is ideal for acoustic monitoring because of the excellent conduction of sound. More over, dolphins are extremely vocal animals that not only communicate using acoustic signals, but also navigate with them as well.

The arrangement of acoustic sensors for such applications have several constraints, first the structure must be open in order to minimize drift from ocean currents, second the structure must be as large as possible to compensate for increased speed of sound in water. In addition the sensors must be arranged to have good resolution in all three dimensional space as underwater environments allow for movement freely in all directions. Directional cues are used to identify animal position, vocalization identification is used track individual animals. The configuration which optimizes many of the performance to constraint value is an open strutted tetrahedral array. The tetrahedral structure is structurally strong and lends itself to being built with a minimum number of struts opening up the array housing to allow for easy water flow through the array. The structure also has equidistant terminal points producing identical sensor separation for all sensors pairs minimizing the computational complexity of the acoustic processing.

Beyond the above, there are several other general and specific application areas for acoustic biomimetic processing including the following:

Speech recognition

Cochlear implants

Population monitoring (including background monitoring as well as localizing/identifying specific members)

Acoustic data logging (data compression)

Underwater acoustic monitoring (both passive and "active" in the sense of providing a stimulus such as in sonar)

Additionally, the concepts disclosed herein can be applied to processing of other forms of energy such as vibrational or seismic energy, which can be utilized for tasks such as machine condition monitoring, nuclear test monitoring, and earthquake or other seismic monitoring. It may be possible to utilize the general processing scheme in conjunction with chemical sensors so as to identify and localize pollutants or other substances of interest against a background of substances.

While this invention has been particularly shown and described with references to preferred embodiments thereof, it will be understood by those skilled in the art that various changes in form and details may be made therein without departing from the spirit and scope of the invention as defined by the appended claims

What is claimed is:

1. A biomimetic processing system operative to process sensor signals in a biomimetic fashion to extract acoustic features therefrom, the sensor signals including a source acoustic signal of interest, comprising:
   (A) a biomimetic preprocessor, including for each sensor signal:
      (1) a filter bank operative to generate a plurality of frequency channels from the sensor signal;
      (2) for each frequency channel:
         (a) compression/rectification circuitry;
         (b) AGC circuitry; and
         (C) multi-threshold spike generation circuitry operative to generate a plurality of streams of spikes for a corresponding plurality of distinct sound level thresholds, each spike being a pulsatile electrical signal analogous to a biological action potential generated by a nerve fiber;
   (B) one or more feature extracting modules each employing event-based processing on the streams of spikes to extract corresponding acoustic features; and
   (C) a feature integration module operative in response to the acoustic features from the feature extracting modules to generate an output identifying a location of the source acoustic signal of interest.

2. A biomimetic acoustic detection system for use in an operating environment, comprising:
   an acoustic acquisition system including a plurality of acoustic sensors in an application-dependent geometric arrangement and being operative to generate respective sensor signals representing respective acoustic inputs to the acoustic sensors;
   a biomimetic processing system according to claim 1; and
   a feature processing sub-system operative to classify the acoustic features extracted by the biomimetic processing sub-system to identify predetermined acoustic sources and their respective locations in the operating environment.

3. A biomimetic processing system according to claim 1, wherein:
   the feature extracting modules include a plurality of inter-sensor time difference (ITD) modules operative to compare spikes of the same frequency bands and thresholds across each pair of the sensors, each ITD module including (1) a coincidence detector acting as a counter, the counter being start-triggered by a spike of one of the sensors of a pair and stop-triggered by a spike of the other sensor of the pair, and (2) a timeout circuit operative to generate an ITD event signal if a time counted by the counter falls within a predetermined time window corresponding to a geometry of the sensors, and to otherwise refrain from generating the ITD event signal; and
   the feature integration module is operative to combine the respective ITD event signals of the ITD modules to derive an indication of direction of the source acoustic signal of interest, the ITD event signals of the respective sound level thresholds being combined in a first weighted fashion to realize a desired dynamic range, the ITD event signals of the respective frequency channels being combined in a second weighted manner to realize a desired signal to noise ratio.

4. A biomimetic processing system according to claim 3, wherein:
   the number of pairs of sensors is greater than one, and the ITD event signals of each pair of sensors indicate a respective cone of confusion for the direction of the source acoustic signal; and
   the ITD event signals of the respective pairs of sensors are combined to find intersections of the cones of confusion to remove spatial ambiguities in the direction of the source acoustic signal.

5. A biomimetic processing system according to claim 1, wherein the feature extracting modules include a plurality of inter-sensor intensity difference (IID) modules operative to compare spikes of the same frequency bands across each pair of the sensors, each IID module including a pair of adder circuits for the spikes of a respective pair of sensors, each adder circuit generating a respective weighted sum of the spikes for the respective sound level thresholds, each IID module further including a differencing circuit operative to compare the weighted sums from the adder circuits.

6. A biomimetic processing system according to claim 1, wherein the feature extracting modules include a plurality of periodicity modules operative to compare time-separated spikes of the same frequency bands, thresholds and sensors, each periodicity module including a coincidence detector acting as a counter, the counter being start-triggered by a first spike of a sensor and stop-triggered by a temporally adjacent second spike of the same sensor.

7. A biomimetic processing system according to claim 1, wherein the AGC circuitry comprises a cascade of AGCs including a first AGC and second AGC, the first AGC having a relatively fast adaptation time and the second AGC having a relatively slow adaptation time, the combination of fast and slow adaptation times being effective to emphasize fast transients and signal onsets while suppressing multiple transients and longer term signal variations that may be associated with reverberation.

8. A biomimetic processing system according to claim 1, wherein the multi-threshold spike generation circuitry includes a low-threshold spike generating circuit, a medium-threshold spike generating circuit, and a high-threshold spike generating circuit, each spike generating circuit including a respective threshold crossing detector, an absolute refractory circuit, and a relative refractory circuit, each threshold crossing detector being operative to compare a signal from the AGC circuitry to a respective threshold value to generate a corresponding spike output.

9. A biomimetic processing system according to claim 8, wherein the threshold value of the low-threshold spike generating circuitry is approximately 20% above a quiescent output value of the AGC circuitry, the threshold value of the medium-threshold spike generating circuitry is approximately 10% above a maximum saturated steady-state output value of the AGC circuitry, and the threshold value of the high-threshold spike generating circuitry is approximately 40% of a maximum peak output value of the AGC circuitry.

* * * * *